United States Patent [19]

Hosokawa et al.

[11] Patent Number: 4,672,279
[45] Date of Patent: Jun. 9, 1987

[54] ROBOT JOINT ANGLE DETECTING SYSTEM

[75] Inventors: Yorio Hosokawa; Shōtaka Sakamoto, both of Kawasaki, Japan

[73] Assignee: Kabushiki Kaisha Toshiba, Kawasaki, Japan

[21] Appl. No.: 783,413

[22] Filed: Oct. 3, 1985

[30] Foreign Application Priority Data

Oct. 11, 1984 [JP] Japan .............................. 59-211435
Dec. 27, 1984 [JP] Japan .............................. 59-273993
Sep. 26, 1985 [JP] Japan .............................. 60-213067

[51] Int. Cl.$^4$ ........................................... G05B 19/42
[52] U.S. Cl. ..................................... 318/568; 307/67; 901/15; 364/513
[58] Field of Search ............. 318/568, 568 D; 307/67; 901/15, 23, 28, 32, 38

[56] References Cited

U.S. PATENT DOCUMENTS

| | | | |
|---|---|---|---|
| 3,514,625 | 5/1970 | Lane ........................................ | 307/67 |
| 4,221,997 | 9/1980 | Flemming ........................ | 318/568 B |
| 4,367,532 | 1/1983 | Crum et al. ...................... | 318/568 A |
| 4,408,286 | 10/1983 | Kikuchi et al. ................. | 318/568 A |
| 4,562,391 | 12/1985 | Inoue ............................... | 318/568 D |
| 4,562,551 | 12/1985 | Inaba et al. ................. | 318/568 B X |
| 4,567,415 | 1/1986 | Frederichs et al. ............ | 318/568 D |

Primary Examiner—Benjamin Dobeck
Attorney, Agent, or Firm—Schwartz, Jeffery, Schwaab, Mack, Blumenthal & Evans

[57] ABSTRACT

In a system for detecting an angle of a joint coupled through a reduction mechanism to a drive motor, an absolute type rotation angle detector and an incremental-type rotation number detector are coupled to the motor for detecting the rotational angle and the rotation number of the motor, respectively. The detected rotational angle and the detected rotation number are used to calculate the rotational angle of the joint. The incremental-type rotation number detector is provided with a battery for energization during interruption of a power supply.

10 Claims, 12 Drawing Figures

FUNCTION TABLE

| SELECT INPUTS | | DATA INPUTS | | | | STROBE | OUTPUT |
|---|---|---|---|---|---|---|---|
| B | A | C0 | C1 | C2 | C3 | G | Y |
| X | X | X | X | X | X | H | L |
| L | L | L | X | X | X | L | L |
| L | L | H | X | X | X | L | H |
| L | H | X | L | X | X | L | L |
| L | H | X | H | X | X | L | H |
| H | L | X | X | L | X | L | L |
| H | L | X | X | H | X | L | H |
| H | H | X | X | X | L | L | L |
| H | H | X | X | X | H | L | H |

ROBOT JOINT ANGLE DETECTING SYSTEM

BACKGROUND OF THE INVENTION

The present invention relates to an improvement to a robot joint angle detecting system including an absolute type rotational angle detector and an incremental type rotation number detector coupled via a reduction gear to an axis of rotation of a joint of a robot.

For control of a robot, accurate detection of the rotational angle of the axis of each joint is vital. In the above-mentioned detecting system, the detectors detects the rotational angle and the rotation number which vary at a higher rate than the axis of the rotation of the joint because of the presence of the reduction gear. If the reduction ratio is represented by 1/R, the joint angle (joint rotational angle) $\theta$ is given by:

$$\theta = (360° \times N + \theta')/R \tag{1}$$

where N represents the number of rotations of the detector, and $\theta$ represents the rotation angle of the rotational angle detector.

For instance, if R=10 (for the sake of simplicity), N=7, $\theta' = 27°$, then $$\theta = (360° \times 7 + 27)/10 = 255.7°$$

An example of the increment type rotation number detector comprises a pulse generator producing pulses once per rotation of the axis on which the pulse generator is mounted and a counter counting the pulses. The absolute type rotation angle detector may comprise a potentiometer or a resolver with an encoder for producing a digital signal indicative of the detected rotational angle.

When the detecting system is connected to a power supply or when the power supply is restored after interruption, the detectors need to be calibrated. More specifically, the joint is rotated to the original or a reference position, and the rotational angle of the rotational angle detector is made to be zero and the counter of the rotation number detector has to be cleared to zero.

Such a calibration has to be effected each time the power supply is restored after interruption of the power supply which may occur if the power fails or if the system is disconnected from the power supply. This lowers the efficiency of work. Moreover, it is sometimes difficult to return the joint to the reference position.

Furthermore, during assembly of the rotation number detector and the rotational angle detector, the zero position alignment must be made accurately, since otherwise error occurs in the detection of the joint angle in the vicinity of 0° of the rotational angle detector.

SUMMARY OF THE INVENTION

An object of the invention is to eliminate the need to return the joint to the reference position upon restoration of the power supply.

Another object of the invention is to eliminate the need for accurate alignment of the rotation number detector and the rotational angle detector during assembly.

According to the invention, there is provided a robot joint angle detecting system for detecting a rotational angle of a joint (2) coupled through a reduction mechanism (3) to a drive motor (M) for driving the joint comprising an absolute-type rotational angle detector (RE) coupled to the shaft of the motor for detecting the rotation angle of the motor, an incremental-type rotation number detector (PG, 4) coupled to the shaft of the motor for detecting the rotation number of the motor, and means (7) responsive to the detected rotational angle of the motor and the detected rotation number of the motor for determining the rotational angle of the joint, characterized in that said incrementaltype rotation number detector is provided with a battery (9) for energization during interruption of a power supply.

BRIEF DESCRIPTION OF THE DRAWINGS

In the accompanying drawings.

DETAILED DESCRIPTION OF THE PREFERRED EMBODIMENT

Figure 1:
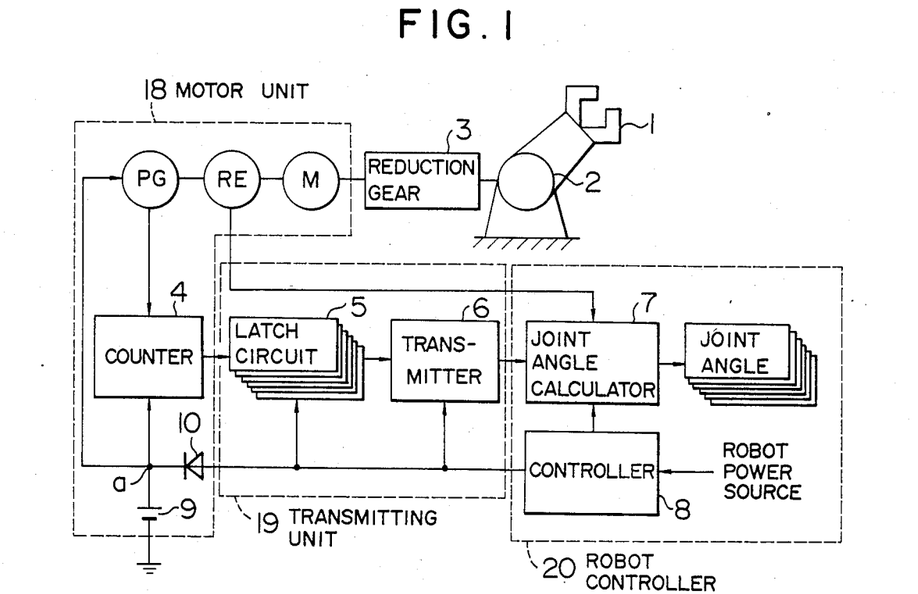
FIG. 1 is a block diagram showing an embodiment of a joint angle detecting system according to the invention.

Referring now more particularly to FIG. 1, there is shown a robot 1 which comprises a plurality of joint axes 2, only one of which is illustrated. Each joint axis is driven by a motor M via a reduction gear 3. A resolvor RE and a pulse generator PG are coupled to the motor M and the pulses generated by the pulse generator PG are counted by a counter 4. The pulse generator PG and the counter 4 are connected via a diode 10 to a power source circuit 8 which will later be described. A battery 9 is also provided for energizing the pulse generator PG and the counter 4. The motor M, the resolver RE, the pulse generator PG, the counter 4, the battery 9 and the diode 10 form a motor unit 18. There are are many motor units 18 as are joint axes 2. Thus, for each joint axis, there is provided a motor unit 18. Also, a battery 9 is provided exclusively for each pair of the pulse generator PG and the counter 4. Each of the motor units 18 is preferably in the form of a "unit" which can be readily separated from the rest of the system.

A set of latch circuits 5 are provided, each for the respective one of the motor units 18 to latch the output of the counter 4. The outputs of the latch circuits 5 are serial-transmitted by a transmitter 6 to a robot controller 20. The latch circuits 5 and the transmitter 6 form a transmitting unit 19.

The position or posture control of the robot is achieved by appropriate drive of the motor M.

The output of each counter 4 indicative of the counted rotation number N is latched by the respective one of the latch circuit 5 and is then transmitted through the transmitter 6 to the robot controller 20. The controller 20 also receives the output of each resolver RE indicative of the instantaneous value of the rotational angle θ′, and performs an arithmetic operation or calculation in accordance with the above-mentioned equation (1) to determine the joint angle θ of each joint. In other words, such calculation is carried out in turn for all the joints whose joint angle needs to be controlled.

When the system is connected to a sound power supply, all the circuits including the counters 4 are fed from the power source 8 provided in the robot controller 20.

When the power supply is interrupted (by failure or disconnection), the counter 4 and the pulse generator PG in each motor unit 18 is energized by the battery 9 within the same motor unit 18. During such interruption of the power supply, the pulse generator PG and the counter 4 of each motor unit 18 continue their operation, so that the count value of the counter 4 is kept "correct" or kept reflecting the rotation of the joint angle even if the joint axis is rotated during the interruption.

The resolver RE, on the other hand, produces a signal indicative of the absolute value at each moment so that, even if the joint is rotated during the interruption, the indication of the resolver becomes correct as soon as the power supply is restored.

It will therefore be understood that as soon as the power supply is restored (after power supply interruption), the correct value of the joint angle is available. That is, there is no need to carry out calibration, and work efficiency is therefore improved.

Figure 2:
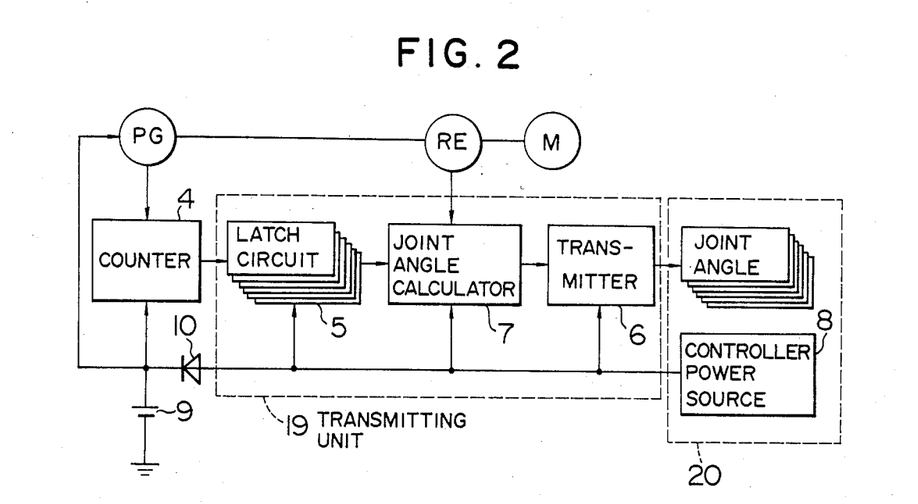
FIGS. 2 through 4 are block diagrams showing other embodiments of the invention.

FIG. 2 shows another embodiment of the invention. In this embodiment, the joint angle calculator 7 is provided in the transmitting unit 19 within the robot main body. The calculated robot joint angle is transmitted by a transmitting circuit 6 to the robot controller 20. The rest of the construction and the operation is similar to that of FIG. 1.

With the use of the embodiment of FIG. 2, the number of signal lines connecting the robot main body and the robot controller can be reduced. This is because the signal lines for the resolver RE (typically six lines including four for two-phase excitation and two for output lines) need not extend to the robot controller 20.

Figure 3:
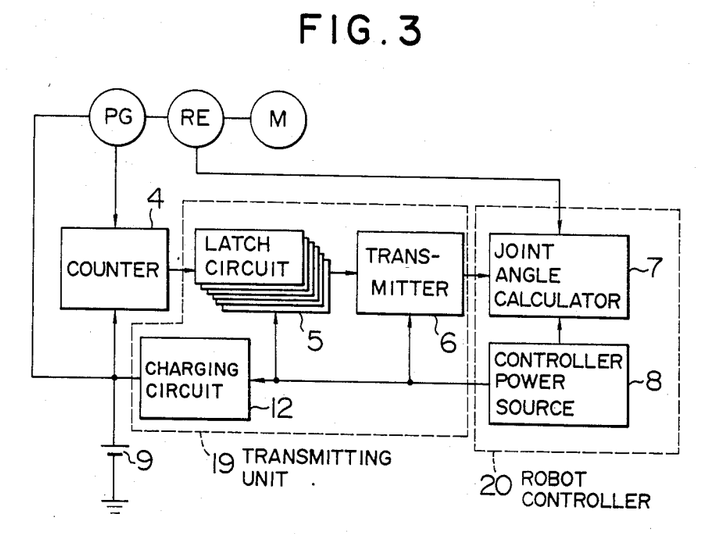

FIG. 3 is a furhter embodiment of the invention. In this embodiment, a charging circuit 12 is provided in the transmitting unit 19 for charging the battery. The battery 9 is a secondary battery which can be re-charged.

Figure 4:
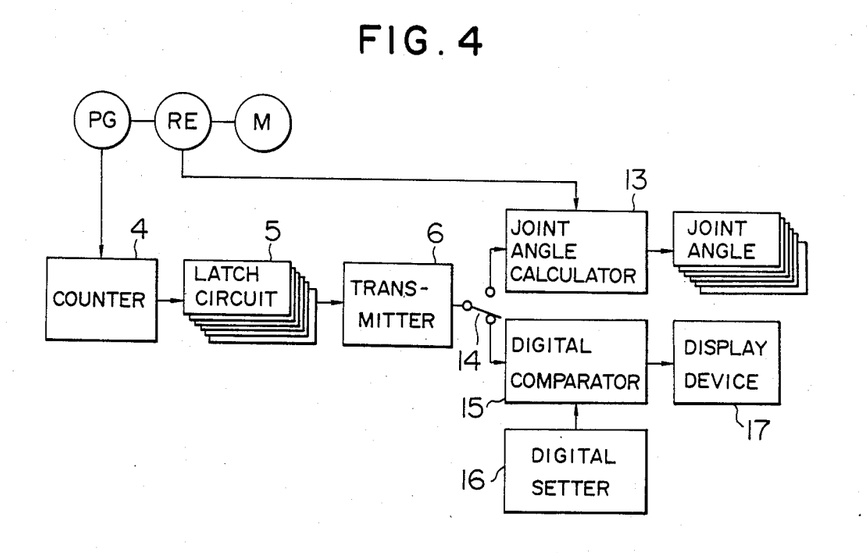

FIG. 4 shows a further embodiment of the invention. The joint angle calculator 13 of this embodiment is also capable of counting the number of rotation. When the power is supplied, the joint angle θ can be detected only from the output of the joint angle calculator 13. When the power supply is interrupted the switch 14 is switched from selecting a digital comparator to the joint angle calculator 13, so that the count value latched in the latch circuit 5 is inputted to the joint angle calculator 13 for use in calculation of the joint angle.

The digital comparator 15 as well as a digital setter 16 and a display device 17 are provided to compare the count value of the counter 4 with a joint angle limit value and produces an alarm by means of the display device 17 to notify the operator that the joint angle is too large.

Figure 5:
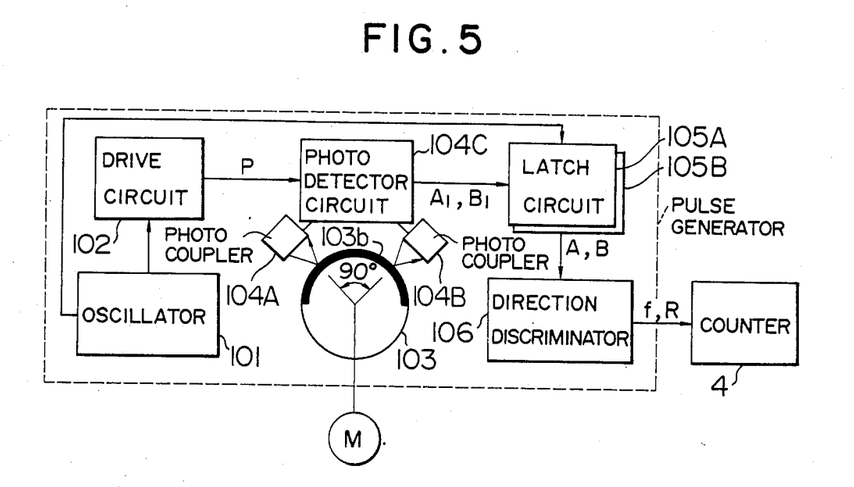
FIG. 5 is a block diagram showing an example of a pulse generator PG.
Figure 6:
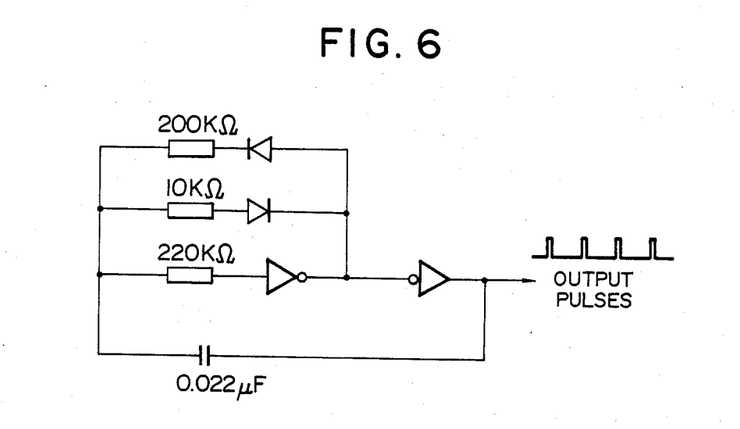
FIG. 6 is a block diagram showing an example of an oscillator shown in FIG. 5.

FIG. 5 shows an example of pulse generator PG. As shown, it comprises an oscillator 101 producing pulses whose ON/OFF ratio is less than 1/100. An example of such an oscillator 101 is illustrated in FIG. 6.

Figure 7:
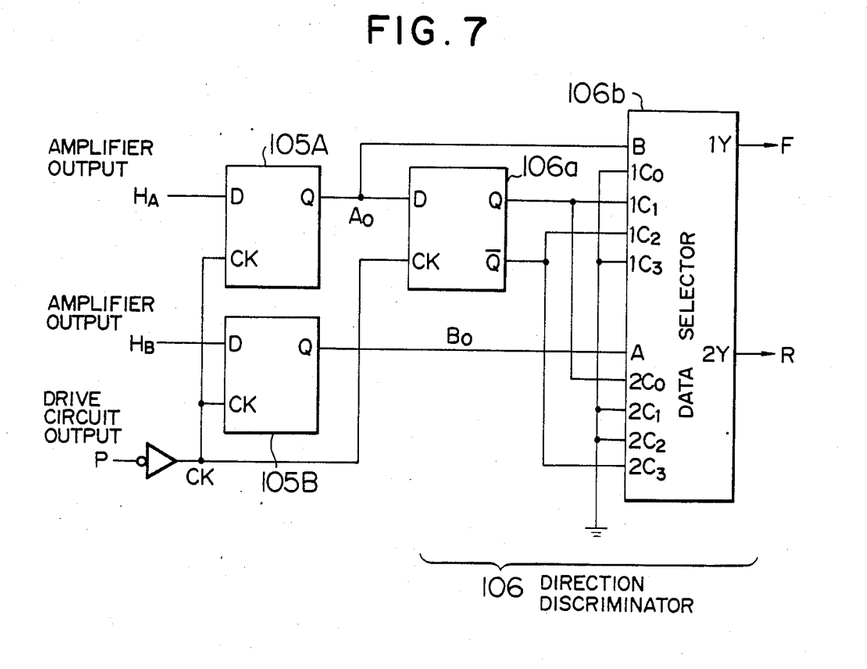
FIG. 7 is a block diagram showing an example of a direct discriminator shown in FIG. 5.
Figure 8:
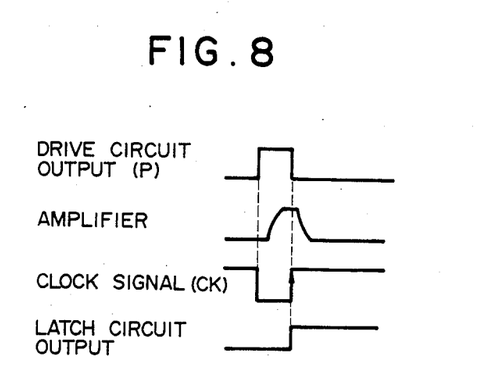
FIG. 8 is a diagram showing operation of the latch circuit shown in FIG. 7.
Figure 9:
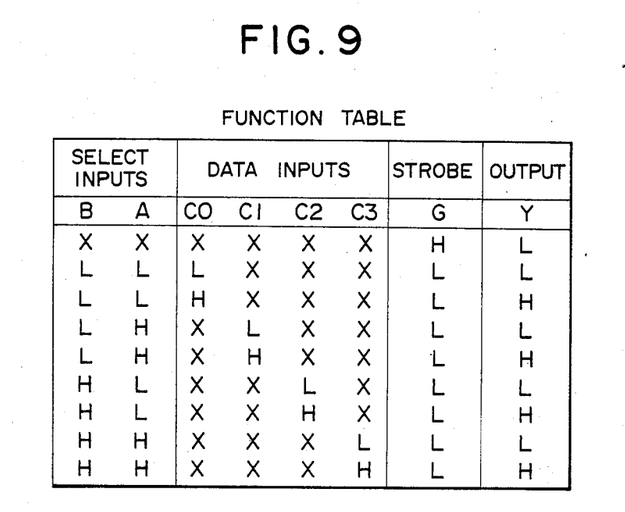
FIG. 9 is a function table showing operation of the data selector shown in FIG. 7.

The pulse generator PG also comprises a drive circuit 102 for periodically driving a pair of photocouplers 104A, 104B when the output of the oscillator 101 is ON, and a disk 103 directly coupled to the shaft of the motor 103 and having a reflective portion 103b which extends one half of the periphery of the disk 103. The photocouplers 104A, 104B are positioned at 90° apart from each other along the periphery of the disk 103 and are periodically driven buy the drive circuit 102 via the photo-detector circuit 104C. The outputs of the photocouplers 104A and 104B are transmitted via the photo-detector circuit 104C to latch circuits 105A and 105B which latch the output pulses from the photocouplers 104A and 104B. A direction discriminator 106 discriminates between the forward and the reverse directions of rotation of the disk 103 (and hence of the motor M) in accordance with the outputs of the latch circuits 105A and 105B, and produces either forward pulses or reverse pulses depending on the result of the discrimination. An example of the direction discriminator 106 is illustrated in FIG. 7. As shown, it comprises a D type flip-flip 106a and a data selector 106b connected as illustrated. Each of the latch circuits 105A and 105B is shown comprising a D type flip-flop. The clock terminal of each of the D type flip-flops respond to a leading edge of an input pulse. The operation of the latch circuits 105A and 105B is shown in FIG. 8. The data selector 106b has a function as shown in the function table of FIG. 9. More specifically, the data selector 106b has an upper and a lower sections. The upper section selects one of the data inputs 1C0–1C3 and produces the selected input as its output 1Y. The lower section selects one of the data inputs 2C0–2C3 and produces the selected input as its output 2Y. The selection depends on the values of the select inputs A and B, which are common to both sections. In the table, "H" represent high level, "L" represents low level and X signifies irrelevant. The STROBE signal is normally set at "L" and is not illustrated in FIG. 7. C0–C3 in the table correspond to both of 1C0–1C3 and 2C0–2C3 in FIG. 7 and, while Y in the table correspond to both of 1Y and 2Y in FIG. 7.

Figure 10:
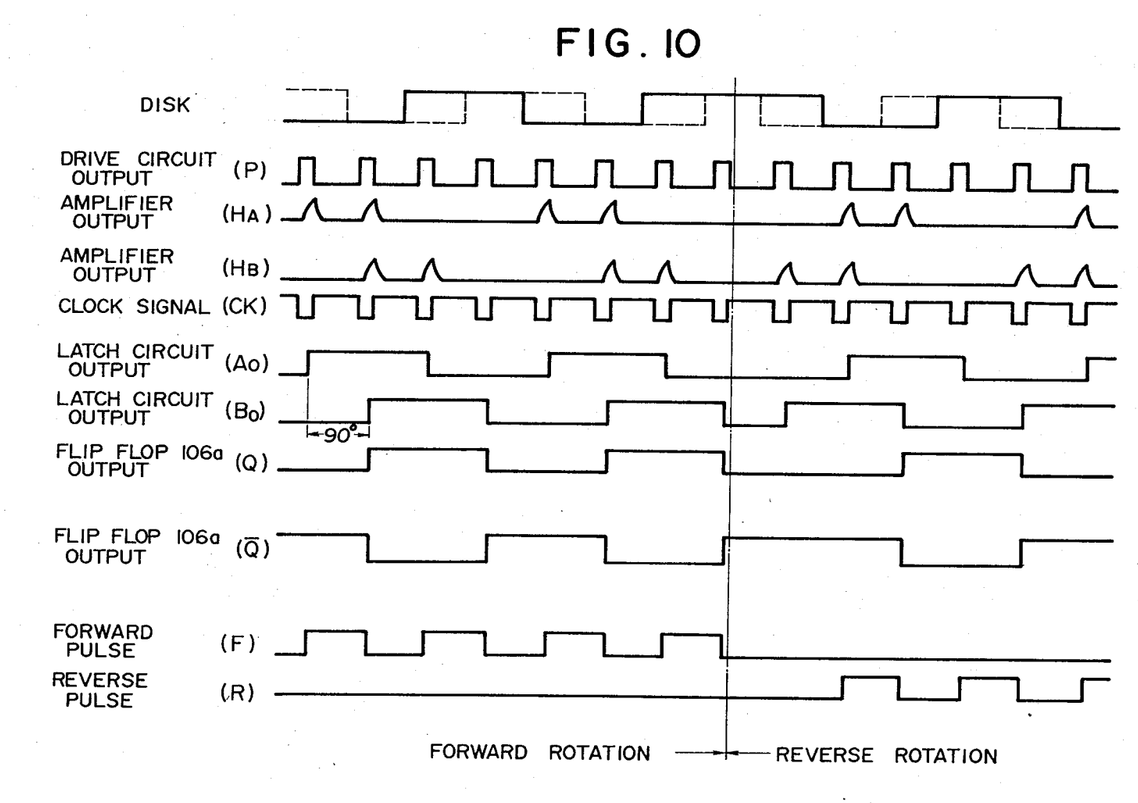
FIG. 10 is a time chart showing operation of the pulse generator shown in FIG. 5.

Operation of the pulse generator PG is described in further detail with reference to FIG. 10.

Drive pulses P are periodically produced by the drive circuit 102 and are fed to photocouplers 104A and 104B, which produce a pulse if the reflecting portion 103b is in confrontation with the photocoupler. The latch circuits 105A and 105B latch the outputs of the photo-couplers when the clock signal CK rises. The outputs Ao and Bo of the latch circuits 105A and 105B are 90° apart from each other, and are applied to the direction discriminator 106.

The reason why the ON/OFF ratio of the pulse of the oscillator 101 is made to be less than 1/100 is to reduce consumption of the battery.

The disk 103 and the photocouplers need not be of the reflection type, but a photocoupler of a through transmission may alternatively be used.

In place of photocouplers, reed relays may be used. If reed relays are driven by pulses and their outputs are latched to produce rotational pulse signals, the consumption of the battery can be further reduced.

Moreover, a detector using a Hall element may be also used.

Figure 11:
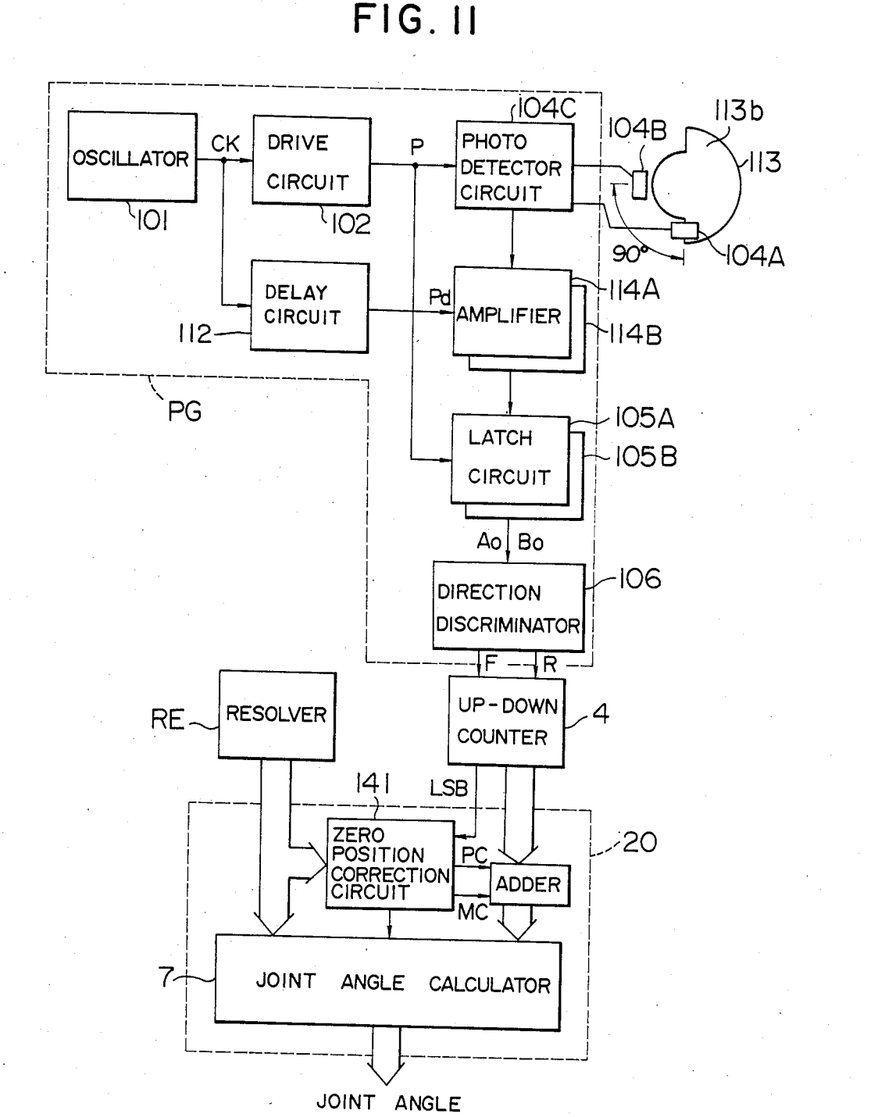
FIG. 11 is a block diagram showing a combination of a pulse generator, a counter and a robot controller of a further embodiment of the invention.

FIG. 11 shows, in part, a further embodiment of the invention. However, the transmitting unit 19 (FIG. 1) is omitted for simplifying the drawings. The period of the output pulses of the oscillator 101 is set to be not more than $\frac{1}{4}$ of the rotation period of the motor M at its maximum speed. The pulse width of the pulses of the oscillator 101 is set to be the time for power supply stabilization of the amplifiers 114A and 114B. The pulses P of the drive circuits 102 rise in synchronism with the trailing edge of the pulses CK and have a duration (pulse width) equal to the response time of the photocouplers.

The detecting system of this embodiment is provided with a delay circuit 112 receiving the pulses CK from the oscillator 101 and producing pulses Pd whose trailing edge lags behind the trailing edge of the corresponding input pulse by a time interval a little longer than the width of the pulse P from the drive circuit 102. Such a delay is introduced to continue energization of amplifiers 114A and 114B amplifying the outputs of the photocouplers 104A and 104B, so that any delayed response of the photocouplers appear in the continued energization period.

The photocouplers 104A and 104B are, in this embodiment, shown to be a photointerruption type and cooperate with a disk 113 having a projection 113b extending one half of the periphery.

The latch circuits 105A and 105B latches the amplified outputs of the photocouplers in synchronism with the trailing edge of the pulses P. The photocouplers are energized only for a period of the width of each pulse. But, because of the delay in response, they hold the response (output) to the pulse P at the time of the trailing edge of the pulse P. As a result, this response at the trailing edge of the pulse P is latched in each of the latch circuits 105A and 105B.

In this way, two-phase outputs similar to those of ordinary pulse generator are obtained at the outputs of the latch circuits 105A and 105B even through the photocouplers 104A and 104B are energized by pulses. It should however be noted that the phase of the outputs of the latch circuits 105A and 105B may be delayed relative to the rotation of the disk 113, but such a delay does not adversely affect the detection of the rotation number of the motor M. Obviously, there is no phase delay when the disk is at a standstill.

These two-phase outputs are inputted into the direction discriminator 106 which produces either forward pulses F or reverse pulses R depending on the direction of the rotation.

Figure 12:
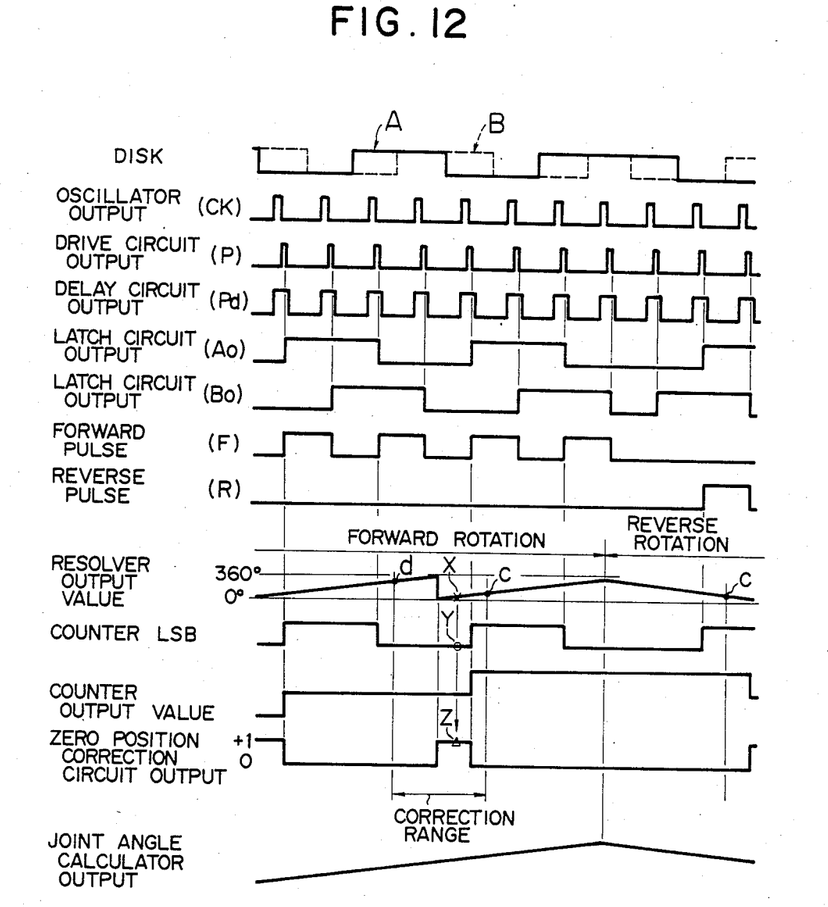
FIG. 12 illustrates a time chart showing operation of the circuit of FIG. 11.

The forward pulses F or the reverse pulses R appear twice each time the disk 113 rotates once. Therefore, the combination of the bits of the respective stages of the counter 4 except the least significant bit (LSB) indicates the rotation number of the motor M, whereas the LSB varies from a first value (0) to a second value (1) and then from the second value (1) to the first value (0) during each rotation of the motor M. In FIG. 12, the curve labelled COUNTER OUTPUT VALUE represents, in analog form, the value or the magnitude of the counter output. It will be seen that the counter output value is changed stepwise substantially at the same time when the resolver output is 0° (or 360°).

The LSB of the counter 4 and the output of the resolver RE are inputted to a zero position correction circuit 141.

Figure 13:
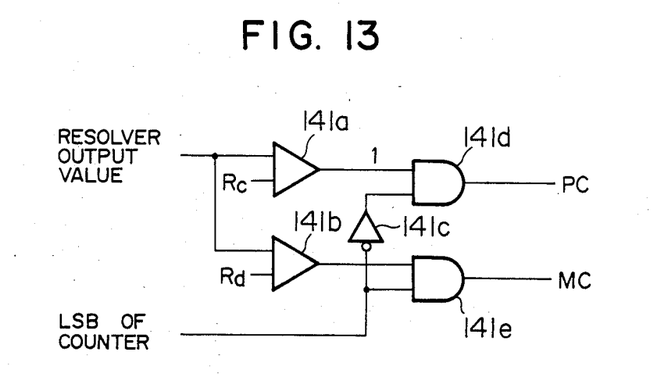
FIG. 13 is a diagram showing an example of the zero position correction circuit shown in FIG. 11.

An example of the zero position correction circuit 141 is shown in FIG. 13. As shown, it comprises a first and a second comparators 141a and 141b. The first comparator 141a compares the output of the resolver RE with a predetermined value Rc, a value close to 0°, and produces a signal "1" when the former is smaller than the latter. The second comparator 141b compares the output of the resolver RE with a predetermined value Rd, a value close to 360°, and produces a signal "1" when the former is larger than the latter.

The zero position correction circuit 141 further comprises an invertor 141c inverting the LSB of the counter 4 and a first and a second AND gates 141d and 141e. The output of the first AND gate 141d is at "1" when the output of the resolver RE is smaller than Rc and, at the same time, the LSB of the counter 4 is at "0". The output of the second AND gate 141e is at "1" when the output of the resolver RE is larger than Rd the LSB of the counter 4 is at "1". The outputs of the first and the second AND gates respectively constitute a plus correction signal PC and a minus correction signal MC.

The correction signals PC and MC are inputted to an adder 143, which also receives the count value of the counter 4. When the plus correction signal PC is present, the adder 143 adds "1" to the count value to produce a corrected count value. When the minus correction signal MC is present, the adder 143 subtracts "1" from the count value to produce a corrected count value.

The corrected count value representing the correct rotation number N and the output of the resolver RE representing the rotational angle $\theta'$ are inputted to a calculator 142, which performs the calculation in accordance with the equation (1).

Where the period of oscillation by the oscillator 101 is one fourth of the period of rotation of the motor M, the values Rc and Rd may be 90° or less and 270° or more, respectively. With shorter period of oscillation, Rc should be smaller and Rd should be larger—more specifically, if $$Rc = \alpha$$

$$Rd = 360 - \alpha$$

should be not more than one half of the period of variation of the LSB of the counter 4.

The above analysis is applicable to a situation where the motor M is rotating. Where the motor M is standstill, $\alpha$ may be made larger.

Because of the arrangement for zero position correction according to the embodiment of FIG. 11, it is not vital to accurately align the zero position relative to the position where an extremity (or end) of the projection is in alignment which one of the photocouplers. As a result, assembly of the resolver RE and the pulse generator PG is facilitated.

In the embodiment of FIG. 11, photocouplers of a through transmission type are used. However, photocouplers of a reflection type may be used in place.

In the embodiment of FIG. 11, amplifiers 114A and 114B are shown provided separately from the photocouplers. But one may use photocouplers with built-in amplifiers, in which case the output Pd of the delay circuit 112 are fed to the power supply terminals of the photocouplers and the separate amplifiers may be omitted.

In the embodiment of FIG. 11, the zero position correction circuit 141 is shown formed of a hardware structure. However, the zero position correction can be performed by suitably programed computer.

As has been described, according to the invention, a battery is provided for energizing incremental-type detector so that operation of the incremental-type detector is continued during interruption of the power supply. Therefore, as soon as the power supply is restored, indication of the joint angle becomes available. For this reason, calibration upon power supply restoration is no longer necessary. Efficiency of work of a robot is therefore improved.

The battery is required only to energize the incremental-type detector, so that it can be of a small size.

Moreover, during assembly of the absolute-type detector and an incremental-type detector, zero-position alignment need not be made accurately but the output of the incremental type detector is corrected and accurate detection of the rotational number and hence the joint angle can be accomplished.

What is claimed is:

1. A robot joint angle detecting system for detecting a rotational angle of a joint of a robot coupled through a reduction mechanism to a shaft of a drive motor for driving the joint comprising: an absolute-type rotational angle detector coupled to the shaft of the motor for detecting the rotational angle of the motor, an incremental-type rotation number detector coupled to the shaft of the motor for detecting the rotation number of the motor, and means responsive to the detected rotational angle of the motor and the detected rotation number of the motor for determining the rotational angle of the joint, said incremental-type rotation number detector being provided with a battery for energization during interruption of a power supply.

2. A system of claim 1, wherein the robot is provided with a plurality of joints, and a combination of said motor, said absolute-type rotational angle detector, and said incremental-type rotation number detector is provided for each of the joints, and a battery is provided exclusively for the incremental-type rotation number detector of each individual combination.

3. A system of claim 2, wherein said combination forms a unit which can be readily separated from the rest of the system.

4. A system of claim 1, wherein said incremental-type rotation number detector comprises a pulse generator producing pulses in synchronism with rotation of the motor and a counter counting the pulses from the pulse generator for producing a count value signal indicative of the rotation number.

5. A system of claim 4, further comprising a latch circuit latching the count value signal from the counter, wherein said determining means determines the joint angle from the output of the latch circuit and the output of the absolute-type rotational angle detector.

6. A system of claim 5, further comprising a transmitting unit built in a main body of the robot, wherein said latch circuit is also built in the main body of the robot said determining means is built in a robot controller unit, and the output of said latch circuit is transmitted through said transmitting unit to said determining means.

7. A system of claim 1, wherein said incremental-type rotation number detector comprises a disk, two photocouplers positioned 90° apart from each other along the periphery of the disk, a drive circuit for feeding drive pulses to the photocouplers, a pair of latch circuits respectively latching the outputs of the photocouplers, a direction discriminator responsive to the outputs of the photocouplers for discriminating between the directions of rotation of the motor, and an up-down counter counting up or down depending on the result of the discrimination.

8. A system of claim 1, further comprising means responsive to the output of the rotation angle detector and the output of the rotation number detector for effecting zero correction for the rotation number detector.

9. A system of claim 8, wherein the rotation number detector and the rotational angle detector are so aligned that the rotation number detected value of the rotation number detector varies by 1 when the rotation angle of the rotational angle detector is substantially at 0°, said system further comprising means for producing a logic signal which varies from a first level to a second level when the rotation number detected value varies by 1 and which varies from the second level to the first level at a time point between the time points when the rotation number detected value varies by 1, means for producing a plus correction signal when the rotational angle detected value is larger than a first predetermined value close to 360° and said logic signal is at said second level, and producing a minus correction signal when the rotational angle detected value is smaller than a second predetermined value close to 0° and said logic signal is at said first level, and means adding 1 to said rotation number detected value when the plus correction signal is produced and subtracting 1 from said rotation number detected value when the minus correction signal is produced, thereby to produce a corrected value detected value of the rotation number.

10. A system of claim 9, wherein said rotation number detector comprises means producing pulses twice per rotation and a counter counting the pulses from said pulse producing means, wherein the outputs of the counter except the least significant bit are produced as the rotation number detected value while the least significant bit is used as said logic signal.

* * * * *